May 28, 1957  R. C. RIKE  2,793,501
DIRECT ACTING MASTER CYLINDER
Filed Sept. 13, 1955
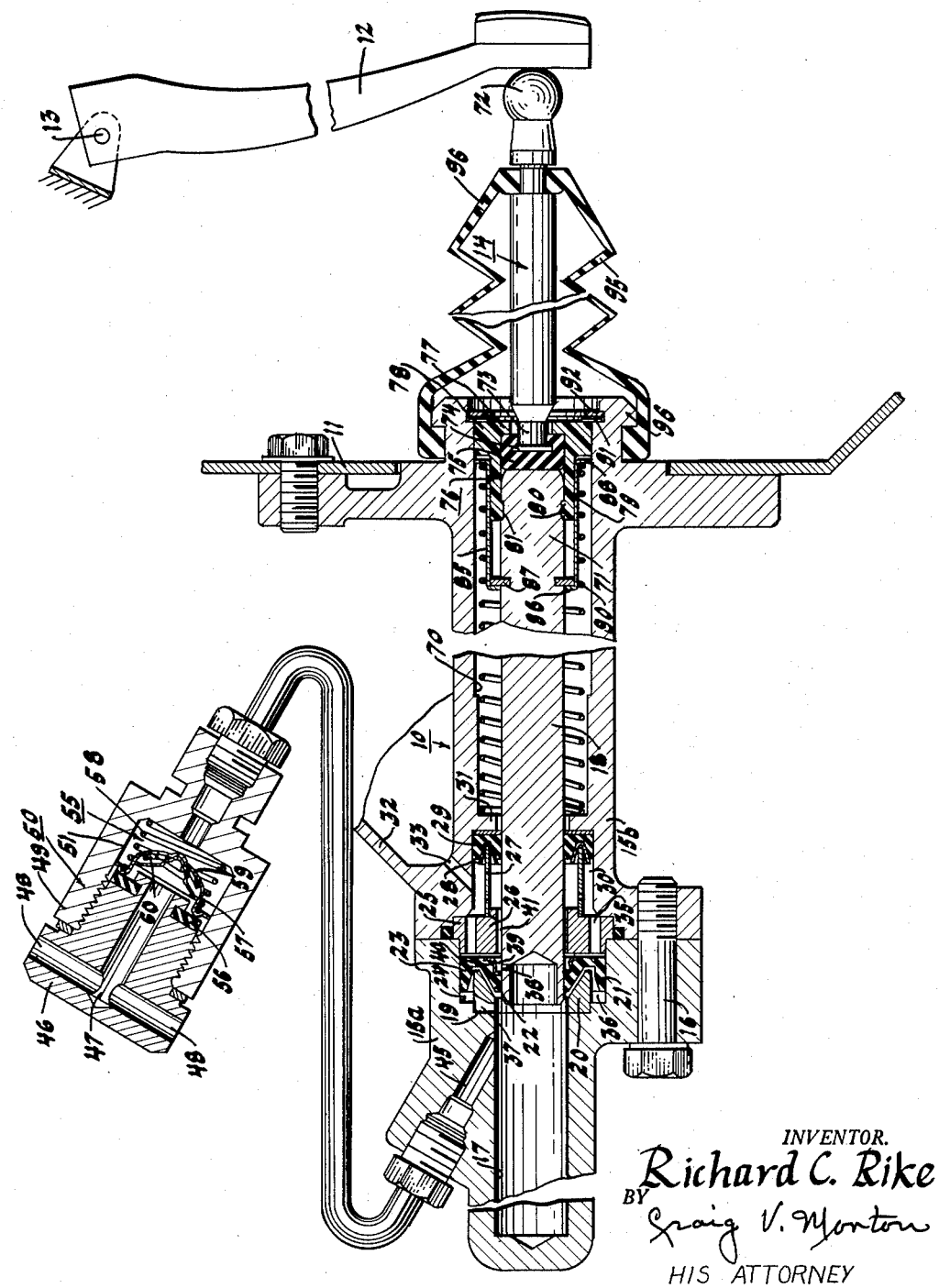
INVENTOR.
Richard C. Rike
BY
HIS ATTORNEY

United States Patent Office 2,793,501
Patented May 28, 1957

2,793,501
DIRECT ACTING MASTER CYLINDER

Richard C. Rike, Dayton, Ohio, assignor to General Motors Corporation, Detroit, Mich., a corporation of Delaware Application September 13, 1955, Serial No. 534,027

11 Claims. (Cl. 60—54.6)

This invention relates to actuating apparatus adapted for use in the operation of hydraulic brakes, more specifically the invention relates to a direct acting master cylinder adapted for mounting on the fire wall of a motor vehicle.

An object of the invention is to provide an improved and simplified structure of a direct acting master cylinder.

In the single figure of the drawing there is disclosed a direct acting master cylinder 10 adapted for mounting on the fire wall 11 of the passenger compartment of a motor vehicle. A brake actuating lever 12 is suspended from a fixed pivot 13 to engage an actuating member 14 whereby to operate the direct acting master cylinder for displacement of hydraulic fluid into a hydraulic brake system for actuating the brakes.

The direct acting master cylinder 10 comprises a two part housing consisting of the housing parts 15a and 15b that are secured together by means of bolts 16. The housing part 15a has an axial bore 17 that receives the forward end of the reciprocable member or displacement plunger 18. The bore 17 has an enlarged diameter portion 19 that receives a ring member 20 supporting a primary seal member 21. The primary seal member is substantially U-shaped in transverse cross section and has its inner lip 22 engaging the outer diameter of the displacement plunger 18 while its outer lip 23 engages the annular wall 24 in the housing part 15a. A supporting ring 25 is provided between the housing parts 15a and 15b and is engaged by the primary seal member 21. The ring 25 has an annular flange 26 that supports a perforated sleeve 27 disposed between the ring 25 and the seal expander 28 that engages the secondary seal 29 positioned within the chamber bore 30 provided in the forward end of the housing part 15b.

That housing part 15b has an inwardly extending annular wall 31 that separates the housing parts 15a and 15b into two chambers in the forward of which the seal structure just described is placed.

A reservoir 32 for hydraulic fluid is formed as a part of the housing part 15b and a supply passage 33 connects the reservoir with the chamber bore 30 for supply of hydraulic fluid to the displacement cylinder 17 during reciprocation of the displacement plunger 18, should fluid be lost from the hydraulic brake system.

Passages 35 in the ring 25 allow fluid to pass from the chamber port 30 to the rear side of the primary seal 21 and around the exterior diameter of the seal into the annular chamber 36 between the seal and the housing part 15a and thence through passages 37 into the displacement cylinder 17. A by-pass port 38 is provided in the displacement plunger 18 through which hydraulic fluid can pass from the chamber 39 provided by the metal retainer 40, the chamber 39 receiving hydraulic fluid from the chamber 30 through the clearance passage 41 provided between the ring 25 and the displacement plunger 18.

On forward movement of the displacement plunger 18 into the displacement cylinder 17, fluid under pressure is delivered through the outlet port 45 into the junction block 50 containing the check valve 55.

The junction block 50 comprises a body part 46 having a central passage 47 that distributes hydraulic fluid to the radial passage 48 for delivery to the hydraulic brakes of the vehicle. The body part 46 is threadedly received in the body part 49 that has a chamber bore 51 in which the check valve 55 is positioned.

The check valve 55 consists of a resilient rubber-like seat member 56 that is engaged by a valve retainer 57, the retainer 57 being held on the seat 56 by a compression spring 58. The valve retainer 57 has ports 59 therein closed by the valve 60 to allow fluid under pressure to pass from the chamber 51 into the passage 47 but prevent reverse flow. Reverse flow of hydraulic fluid for return into the displacement cylinder 17 when the displacement plunger 18 is retracted therefrom is occasioned by lifting of the retainer 57 against the spring 58 for fluid to flow between the retainer 57 and the seat 56. This action of the check valve 55 is that which is normally found in check valves placed in the discharge line from a hydraulic master cylinder to regulate fluid to and from the hydraulic brakes and provide for residual pressure in the lines between the check valve and the wheel cylinders of the hydraulic brakes.

The rearward end of the displacement plunger 18 is positioned within a chamber bore 70 provided in the housing part 15b. The rearward end 71 of the displacement plunger 18 is connected with the actuating member 14 whereby to provide for reciprocation of the displacement plunger 18 within the displacement cylinder 17 upon movement of the brake lever 12.

The rearward end of the actuating member 14 is connected with the brake actuating lever 12 by a suitable ball socket joint 72. The forward end of the actuating member 14 has a reduced diameter portion 73 that terminates in a headed portion 74. A rubber-like resilient connector member 75 is placed upon the headed end 74 of the actuating member 14 and is disposed in engagement with the rearward end of the displacement plunger 18.

The resilient connector member 75 is held in engagement with the displacement plunger 18 by means of a sleeve member 76 that is placed around the connector member 75 and the rearward end 71 of the displacement plunger 18.

The sleeve member 76 is preferably formed of a nonmetallic material such as one of the plastic materials which may be of the class including the nylons (polyamids and superpolyamids). The sleeve 76 has a radially inwardly extending flange 77 that engages one side of the resilient connector 75. The sleeve 76 is also provided with an outwardly extended radial flange 78 that engages the wall of the chamber bore 70 whereby to form a guide for supporting the rearward end 71 of the displacement plunger 18 during its reciprocal movements. The forward end of the sleeve 76 is of reduced cross section to form collar 79 that has a radially inwardly extending annular ridge 80 at the forward end thereof. The ridge 80 fits within an annular recess 81 provided in the outer periphery of the rearward end 71 of the displacement plunger whereby the sleeve 76 is held in position on the displacement plunger 18 and thereby holds the actuating member 14 against the end of the displacement plunger 18.

The collar 79 of the sleeve 76 is sufficiently resilient, being made of a nylon material, that the collar 79 will expand in diameter over the end of the displacement plunger to allow the ridge 80 in the collar to snap into place in the recess 81 in the displacement plunger. The construction thereby allows for detachment of the sleeve 76 and thereby the actuating member 14 from the displacement plunger 18.

The metal sleeve 85 is positioned around the collar 79 of the sleeve 76 and in engagement therewith to prevent radial expansion of the collar 79 and thereby detachment of the sleeve 76 from the displacement plunger 18. The sleeve 85 has a radially inwardly extending flange 86 that engages a stop ring 87 provided on the displacement plunger 18. The sleeve 85 also has a radially outwardly extending flange 88 that is engaged by one end of a compression spring 90 having the opposite end engaging the transverse wall 31 of the housing part 15b. The compression spring 90 thereby retains the sleeve 85 in the position illustrated in the drawing to prevent radial expansion of the collar 79. However, when the sleeve 85 is movable forwardly off of the collar 79, as can be done on disassembly of the structure, the collar can then expand to allow detachment of the sleeve 76 from the displacement plunger 18.

The compression spring 90 also provides means for effecting movement of the displacement plunger in one direction of its reciprocal movements, specifically the spring 90 moves the displacement plunger in a right hand direction as viewed in the drawing, that is, effects retraction of the displacement plunger 18 from the displacement cylinder 17.

The sleeve 76 abuts a wave spring 91 that is held in the end of the chamber bore 70 by means of a snap ring 92. The wave spring 91 takes up for play of the snap ring in its retaining recess and provides a resilient bumper engaged by the sleeve 76 on the retraction stroke of the displacement plunger 18.

A rubber boot 95 is provided between the open end 96 of the housing part 15b and the actuating member 14 to prevent entry of foreign material into the chamber 70. A suitable vent 96 is provided in the boot 95 to prevent it from becoming pressure bound.

While the form of embodiment of the invention as herein disclosed constitutes a preferred form, it is to be understood that other forms might be adopted as may come within the scope of the claims which follow.

What is claimed is as follows:

1. Actuating apparatus adapted for use with hydraulic brakes, comprising, a housing having a longitudinally extending bore containing a reciprocable member to effect displacement of hydraulic fluid from the bore, an actuating member having a head enlargement on one end, a resilient connector member on said head and engaging one end of said reciprocable member, a sleeve member around said connector and the said one end of said reciprocable member holding said connector on said one end, attaching means between said sleeve and the said one end detachably retaining said sleeve and thereby said connector on said one end, and retaining means on said sleeve preventing detachable release of said attaching means and movable relative to said sleeve to provide for detachable release of said attaching means.

2. Actuating apparatus adapted for use with hydraulic brakes, comprising, a housing having a longitudinally extending bore containing a reciprocable member to effect displacement of hydraulic fluid from the bore, an actuating member having a head enlargement on one end, a resilient connector member on said head and engaging one end of said reciprocable member, a sleeve member around said connector and the said one end of said reciprocable member holding said connector on said one end, attaching means between said sleeve and the said one end detachably retaining said sleeve and thereby said connector on said one end, and retaining means on said sleeve preventing detachable release of said attaching means and movable off of said sleeve to provide for detachable release of said attaching means.

3. Actuating apparatus adapted for use with hydraulic brakes, comprising, a housing having a longitudinally extending bore containing a reciprocable member to effect displacement of hydraulic fluid from the bore, an actuating member having a head enlargement on one end, a resilient connector member on said head and engaging one end of said reciprocable member, a sleeve member around said connector and the said one end of said reciprocable member holding said connector on said one end, attaching means between said sleeve and the said one end detachably retaining said sleeve and thereby said connector on said one end, and spring means engaging said attaching means holding the same in position to prevent detachable release of said attaching means.

4. Actuating apparatus adapted for use with hydraulic brakes, comprising, a housing having a longitudinally extending bore containing a reciprocable member to effect displacement of hydraulic fluid from the bore, an actuating member having a head enlargement on one end, a resilient connector member on said head and engaging one end of said reciprocable member, a sleeve member around said connector and the said one end of said reciprocable member holding said connector on said one end, attaching means between said sleeve and the said one end of said reciprocable member holding said connector on said one end, attaching means between said sleeve and the said one end detachably retaining said sleeve and thereby said connector on said one end, and spring means engaging said attaching means holding the same in position to prevent detachable release of said attaching means and concurrently effective for movement of said reciprocable member in one direction of its reciprocable movements.

5. Actuating apparatus adapted for use with hydraulic brakes, comprising, a housing having a longitudinally extending bore containing a reciprocable member to effect displacement of hydraulic fluid from the bore, an actuating member having a head enlargement on one end, a resilient connector member on said head and engaging one end of said reciprocable member, a sleeve member around said connector and the said one end of said reciprocable member holding said connector on said one end, and having an enlarged portion engaging said bore slidably providing thereby guide means for said one end on reciprocation of said reciprocable member, attaching means between said sleeve and the said one end detachably retaining said sleeve and thereby said connector on said one end, retaining means on said sleeve preventing detachable release of said attaching means and movable relative to said sleeve to provide for detachable release of said attaching means.

6. Apparatus in accordance with claim 5 in which said sleeve member is formed of a non-metallic material of a class comprising polyamids and super-polyamids.

7. Actuating apparatus adapted for use with hydraulic brakes, comprising, a housing having a longitudinally extending bore containing a reciprocable member to effect displacement of hydraulic fluid from the bore, said housing having a transverse wall between opposite ends of the bore separating the bore into two chambers, seal means on one side of said wall and through which said reciprocable member extends into the chamber on the said one side of said wall for displacement of hydraulic fluid therefrom, said reciprocable member having the opposite end thereof movable within the other chamber at the opposite end of said bore, an actuating member having a head enlargement on one end, a resilient connector member on said head and engaging the end of said reciprocable member in said other chamber, a sleeve member around said connector and the end of said reciprocable member engaged thereby holding said connector thereon, attaching means between said sleeve and the end of said reciprocable member engaged by said connector detachably retaining said sleeve and thereby said connector thereon, retaining means on said sleeve around said attaching means preventing detachable release of said attaching means and movable relative to said sleeve to provide for detachable release of said attaching means, and spring means between said retaining means and said transverse wall holding said retaining means in position to prevent detachable release of said attaching means and concurrently effective for movement of said reciprocable member in one direction of its reciprocable movements.

8. Actuating apparatus adapted for use with hydraulic brakes, comprising, a housing having a longitudinally extending bore containing a reciprocable member to effect displacement of hydraulic fluid from the bore, said housing having a transverse wall between opposite ends of the bore separating the bore into two chambers, seal means on one side of said wall and through which said reciprocable member extends into the chamber on the said one side of said wall for displacement of hydraulic fluid therefrom, said reciprocable member having the opposite end thereof movable within the other chamber at the opposite end of said bore, an actuating member having a head enlargement on one end, a resilient connector member on said head and engaging the end of said reciprocable member in said other chamber, a sleeve member around said connector and the end of said reciprocable member engaged thereby having an inwardly extending flange confining said connector between the said flange and the said end of the said reciprocable member, attaching means between said sleeve and the end of said reciprocable member engaged thereby detachably retaining said sleeve and thereby said connector on the said end, a second sleeve around said first sleeve and engaging the same to prevent detachable release of the attaching means and movable relative to said sleeve to provide for detachable release of said attaching means, and spring means between said second sleeve and said transverse wall retaining said second sleeve in position to prevent detachable release of said attaching means.

9. Apparatus in accordance with claim 8 in which said first sleeve also includes an upwardly extending flange slidably engaging the wall of said other chamber providing thereby guide means for the end of said reciprocable member in said chamber.

10. Actuating apparatus adapted for use with hydraulic brakes, comprising, a housing having a longitudinally extending bore containing a reciprocable member to effect displacement of hydraulic fluid from the bore, said housing having a transverse wall between opposite ends of the bore separating the bore into two chambers, seal means on one side of said wall and through which said reciprocable member extends into the chamber on the said one side of said wall for displacement of hydraulic fluid therefrom, said reciprocable member having the opposite end thereof movable within the other chamber at the opposite end of said bore, an actuating member having a head enlargement on one end, a resilient connector member on said head and engaging the end of said reciprocable member in said other chamber, a sleeve member around said connector and the end of said reciprocable member engaged thereby having an inwardly extending flange confining said connector between the said flange and the said end of the said reciprocable member, said sleeve having an annular inwardly extending ridge at the end thereof opposite to said flange, the end of said reciprocable member engaged by said connector having an annular recess engaged by said annular ridge on said sleeve whereby to retain said sleeve on position on said end of said reciprocable member, a second sleeve surrounding said first sleeve and engaging the same to prevent radial expansion of said first sleeve in the area of said ridge thereon to prevent detachment of said first sleeve from said reciprocable member, and spring means between said second sleeve and said transverse wall retaining said second sleeve in position on said first sleeve to prevent the said expansion thereof.

11. Actuating apparatus adapted for use with hydraulic brakes, comprising, a housing having a longitudinally extending bore containing a reciprocable member to effect displacement of hydraulic fluid from the bore, said housing having a transverse wall between opposite ends of the bore separating the bore into two chambers, seal means on one side of said wall and through which said reciprocable member extends into the chamber on the said one side of said wall for displacement of hydraulic fluid therefrom, said reciprocable member having the opposite end thereof movable within the other chamber at the opposite end of said bore, an actuating member having a head enlargement on one end, a resilient connector member on said head and engaging the end of said reciprocable member in said other chamber, a sleeve member around said connector and the end of said reciprocable member engaged thereby having an inwardly extending flange confining said connector between the said flange and the said end of the said reciprocable member, said sleeve having an annular inwardly extending ridge at the end thereof opposite to said flange, the end of said reciprocable member engaged by said connector having an annular recess engaged by said annular ridge on said sleeve whereby to retain said sleeve on position on said end of said reciprocable member, a second sleeve surrounding said first sleeve and engaging the same to prevent radial expansion of said first sleeve in the area of said ridge thereon to prevent detachment of said first sleeve from said reciprocable member, spring means between said second sleeve and said transverse wall retaining said second sleeve in position on said first sleeve to prevent the said expansion thereof, and stop means on said reciprocable member engaged by said second sleeve to position said second sleeve relative to said first sleeve and adapted to engage said transverse wall to limit maximum movement of said reciprocable member.

References Cited in the file of this patent

UNITED STATES PATENTS

| | | |
|---|---|---|
| 1,786,856 | Madden | Dec. 30, 1930 |
| 1,841,696 | Andres | Jan. 19, 1932 |
| 1,969,872 | Bowen | Aug. 14, 1934 |
| 2,158,890 | Antelme | May 16, 1939 |
| 2,639,172 | Leonard | May 19, 1953 |